US012312114B2

(12) United States Patent
Farlotti

(10) Patent No.: US 12,312,114 B2
(45) Date of Patent: May 27, 2025

(54) METHOD AND DEVICE FOR PACKAGING ARTICLES

(71) Applicant: QUADIENT TECHNOLOGIES FRANCE, Bagneux (FR)

(72) Inventor: Laurent Farlotti, Arcueil (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 33 days.

(21) Appl. No.: 18/076,586

(22) Filed: Dec. 7, 2022

(65) Prior Publication Data

US 2023/0102381 A1 Mar. 30, 2023

Related U.S. Application Data

(62) Division of application No. 17/201,940, filed on Mar. 15, 2021, now Pat. No. 11,548,666.

(30) Foreign Application Priority Data

Mar. 16, 2020 (EP) .................................... 20305271

(51) Int. Cl.

| | |
|---|---|
| ***B65B 5/02*** | (2006.01) |
| ***B31B 50/00*** | (2017.01) |
| ***B65B 43/10*** | (2006.01) |
| ***B65B 43/14*** | (2006.01) |
| ***B65B 61/22*** | (2006.01) |
| *B31B 100/00* | (2017.01) |
| *B31B 120/10* | (2017.01) |

(52) U.S. Cl.

CPC .......... *B65B 5/024* (2013.01); *B31B 50/0042* (2017.08); *B65B 43/10* (2013.01); (Continued)

(58) Field of Classification Search

CPC .......... B65D 5/42; B65D 5/6626; B65D 5/24; B31B 50/26; B31B 50/0042; (Continued)

(56) References Cited

U.S. PATENT DOCUMENTS 2,021,980 A 11/1935 Bachmeyer
2,090,375 A 8/1937 Rosenthal et al.
(Continued)

FOREIGN PATENT DOCUMENTS

CN 105620851 A 6/2016
EP 2951098 A1 12/2015
(Continued)

OTHER PUBLICATIONS

European Search Report for EP 20 30 5271, mailed Nov. 10, 2020, 3 pages.

*Primary Examiner* — Thomas M Wittenschlaeger
(74) *Attorney, Agent, or Firm* — Cozen O'Connor

(57) ABSTRACT

A device for automated packaging of articles, comprising a conveyor for feeding and transporting into the device a blank of corrugated cardboard, a pair of crease wheels for creating two longitudinal crease lines in the blank, a transversal blade or score applicator for successively creating four transversal crease lines in the blank as the blank is transported into the device, and opposite pressing members such as jaws of a press and/or pressing rollers, arranged symmetrically with respect to a center line of the device, whose lateral position is adjustable for their ends or tips to match the two longitudinal crease lines, and activated in a timely manner as the blank is transported into the device to crush the corrugated cardboard in the top, middle and bottom corners of the blank in order to make it easily foldable.

7 Claims, 8 Drawing Sheets

(52) U.S. Cl.
CPC .............. *B65B 43/14* (2013.01); *B65B 61/22* (2013.01); *B31B 2100/0024* (2017.08); *B31B 2120/102* (2017.08); *B65B 2210/04* (2013.01)

(58) Field of Classification Search
CPC ..... B31B 50/002; B31B 50/25; B31B 50/004; B31B 50/59; B31B 2100/002; B31B 2100/0024; B31B 2120/102; B65B 43/14; B65B 5/024; B65B 61/22; B65B 43/10; B65B 2210/04
See application file for complete search history.

(56) References Cited

U.S. PATENT DOCUMENTS

| | | | | | |
|---|---|---|---|---|---|
| 3,995,539 | A * | 12/1976 | Wallin | B31B 50/00 | 493/182 |
| 4,033,242 | A * | 7/1977 | Rice | B31B 50/005 | 493/126 |
| 5,830,118 | A * | 11/1998 | Nicholson | B31B 70/142 | 383/122 |
| 5,964,686 | A * | 10/1999 | Bidlack | B26F 1/00 | 493/63 |
| 2002/0148203 | A1* | 10/2002 | Waddell, II | B65B 5/105 | 53/446 |
| 2015/0158656 | A1* | 6/2015 | McKinnon | B31B 50/142 | 220/592.2 |
| 2015/0360433 | A1* | 12/2015 | Feijen | B31B 50/74 | 493/162 |
| 2019/0308383 | A1* | 10/2019 | Provoost | B31B 50/006 | |

FOREIGN PATENT DOCUMENTS

| | | | |
|---|---|---|---|
| JP | S61127470 | A | 6/1986 |
| JP | H04128218 | U | 11/1992 |
| JP | 2009202882 | A | 9/2009 |
| JP | 2015058937 | A | 3/2015 |
| WO | 2014119439 | A1 | 8/2014 |

* cited by examiner

METHOD AND DEVICE FOR PACKAGING ARTICLES

The present application relates to the field of parcel packaging and in particular to a method for packaging articles into a box, a manufacturing method of said box to accommodate the dimensions of articles to be packaged, and a device for automated packaging of articles into said box.

BACKGROUND

Automated packaging systems have been recently introduced, where the parcel is created around the articles to be shipped, either for protecting them or assembling them in a single shipment. This process results in parcels of variable size that can be adjusted to the article dimensions. Consequently, the need of stuffing materials is reduced, as well as the overall volume of parcels to be transported. It has been calculated that using a 3D packaging machine can generate up to 30% savings in transportation cost and carbon footprint.

A method and system for automatically forming a packaging box and packaging at least one article therein is described for instance in EP2951098 published in the name of the applicant. Four folding units fold side and end panels of a blank upwardly. The folding units comprise a front pair and a rear pair positioned at a longitudinal distance in conveying direction. The two folding units of each pair are positioned at a transverse distance respective from each other. Said longitudinal and transversal distances are adjustable during feeding of the blank into the supporting station. The system can also package a group of articles to be shipped together.

The system of EP2951098 measures the overall dimensions of the article, or group of articles, to be packaged and automatically creates a box from a cardboard blank, which is cut to size from a roll or fan-fold supply stock. In order to fold the box of EP2951098, many transversal cut-outs are created on the blank, as can be seen in FIG. 6. This has several drawbacks. Firstly, the system requires a pair of knives to form transversal cut lines of suitable length at calculated intervals. This operation complicates the box manufacturing process. Secondly, it generates dust that pollutes the manufacturing environment, can accumulate in the machine and cause malfunctions. Thirdly, the box so created has many overlapping flaps, which makes it difficult to fold, irregular in shape and unstable, as the flaps are not firmly bound together. The number of parcels that can be stacked on top of each other is thus limited, and the space savings are partly annihilated. So there is a need for a box more regular in shape, stiffer and easier to manufacture. There is also a need for a box which doesn't require lateral cut-outs in order to reduce cardboard dust or chips in the manufacturing environment.

OBJECT AND DEFINITION OF THE INVENTION

It is therefore an object of the invention to provide a method of packaging articles into a box which can be easily manufactured from a supply of cardboard blanks without requiring lateral cut-outs, and easily folded.

It is another object of the invention to provide a box that is regular in shape and stiff enough, so that parcels can be stacked on top of each other on pallets or other containers.

It is another object of the invention to provide a box whose size can be rapidly adjusted to the dimensions of the article, or group of articles, to be packaged therein.

It is also an object of the invention to provide a method and device to manufacture said box.

These objects are achieved by a method for packaging articles into a box, comprising:

a) manufacturing a blank of corrugated cardboard, the blank having two longitudinal crease lines and four transversal crease lines, the crease lines delimiting a bottom panel, a top panel, a front panel, internal and external rear panels, two internal and two external side panels, two top corners, two middle corners and two bottom corners, wherein the blank is crushed in the top, middle and bottom corners, in order to make the blank easily foldable;

b) placing the articles to be packaged on the bottom panel;

c) folding the internal side panel upwards;

d) folding the front panel upwards to abut against the internal side panels;

e) pushing the bottom corners inwards in order for them to fold inside the box when the internal rear panel will be folded upwards;

f) folding the internal rear panel upward to abut against the internal side panel;

g) folding the top panel downwards to abut against the internal panels;

h) folding the external rear panel downwards to abut against the internal rear panel;

i) pushing the middle and top corners inwards in order for them to fold between the internal and external side panels when the latter's will be folded; and j) folding the external side panels downwards.

The application also relates to a device for automated packaging of articles, comprising a conveyor for feeding and transporting into the device a blank of corrugated cardboard, a pair of crease wheels for creating two longitudinal crease lines in the blank, a transversal blade or score applicator for successively creating four transversal crease lines in the blank as the blank is transported into the device, and opposite pressing members such as jaws of a press and/or pressing rollers, arranged symmetrically with respect to a center line of the device, whose lateral position is adjustable for their ends or tips to match the two longitudinal crease lines, and activated in a timely manner as the blank is transported into the device to crush the corrugated cardboard in the top, middle and bottom corners of the blank in order to make it easily foldable.

Preferably, the entire surface of the bottom and top corners is crushed, and the crushed portion of the middle corners has the shape of two symmetrical, partly superimposed, triangles. Other shapes are possible, for instance a square delimited by the crease lines, but the resulting box may be less easy to fold.

The three dimensions of the box are determined by the distances between the crease lines. Two lateral strips of the blank can be cut away if the original blank supply is too wide compared to the dimensions of the article, or group of articles, to be packaged. This operation can be performed by two adjustable cutting wheels and a transversal cutting blade or a transverse cutter as the blank is transported into the device. A moderate amount of dust may be generated and easily collected at this stage.

The two longitudinal crease lines are created by two adjustable crease wheels as the blank is moving into the device. The four transversal crease lines are created by a transversal blade or score applicator which is activated in a timely manner as the blank is transported into the device. The same or another blade cuts the blank at the desired length.

The articles to be packaged are placed on the blank in a manner similar to EP2951098. The blank is then folded along the crease lines to form a box around the articles. The resulting box is a parallelepiped having one layer of corrugated cardboard in the top and bottom panels, but two plain layers of corrugated cardboard on three of its lateral sides. It is therefore very robust and many parcels can be stacked on top of each other without the bottom ones being collapsed.

The corners are folded inside the external panels so they do not protrude outside the box. As the corrugated cardboard has been crushed in these areas, there is no excessive thickness due to overlapping flaps and the box' shape is more regular than the one of EP2951098. The external panels are preferably bond to the internal panels by hot melt glue. Alternatively, adhesive tape may be applied to seal the box.

BRIEF DESCRIPTION OF THE DRAWINGS

Embodiments of the invention will be described and explained with additional specificity and detail through the use of the accompanying drawings in which.

DETAILED DESCRIPTION OF EXEMPLARY EMBODIMENTS

In the following description, the term "articles" will designate one or more articles.

Figure 1:
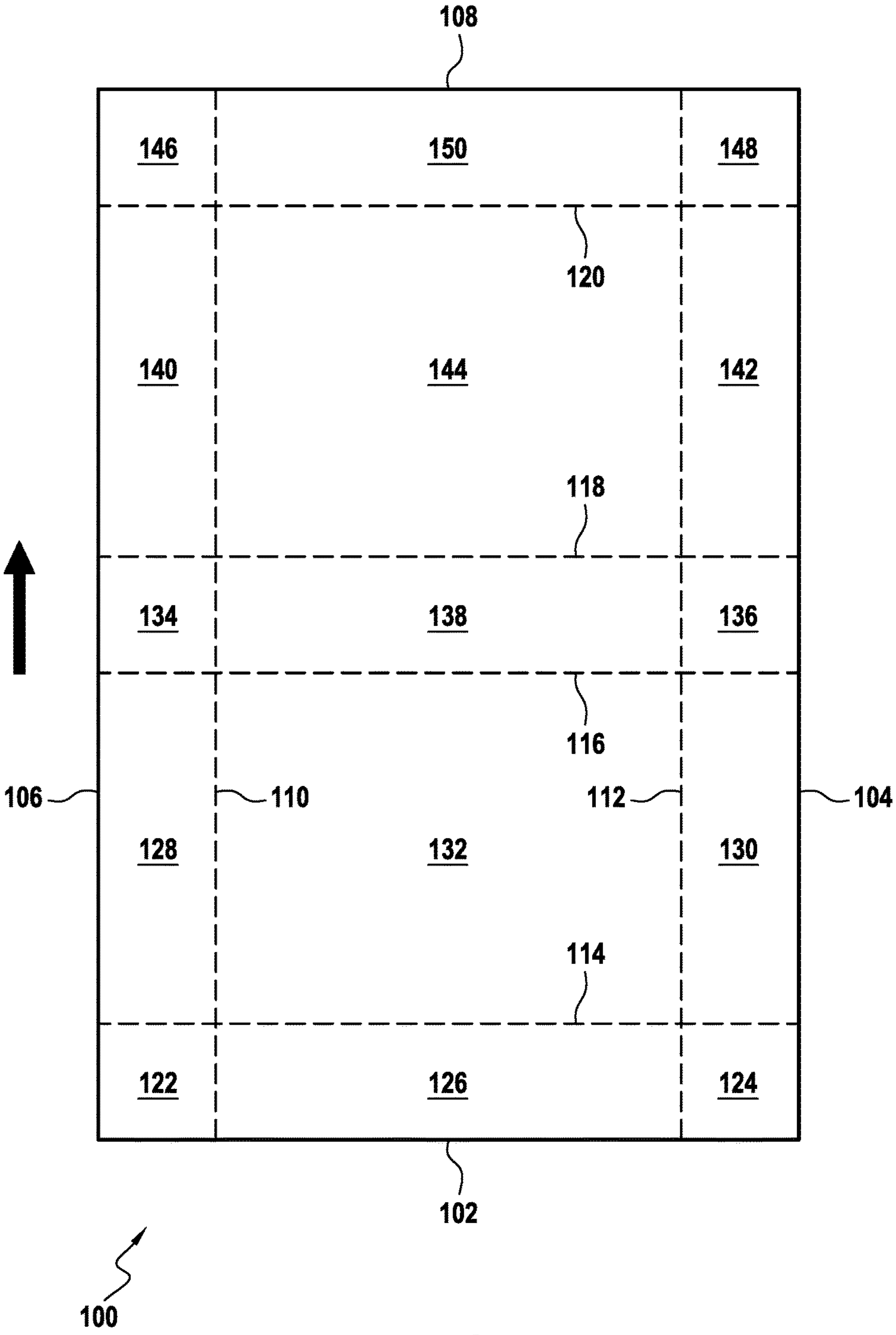
FIG. 1 is a view of a blank with crease lines created according to the desired box dimensions.

FIG. 1 is a view of a blank 100 with crease lines created according to the desired box dimensions. The arrow indicates the direction of transport of the blank in an automated packaging device.

Preferably, the blank 100 is cut to size according to the dimensions of the articles to be packaged. The blank may also be pre-cut to standard dimensions corresponding to the articles that are shipped the most often. The blank is typically made of corrugated cardboard. Such cardboard as illustrated on FIG. 2B is usually stiff enough for product packaging and parcels but becomes flexible after being crushed as its thickness is reduced significantly. Similarly, crease lines can be created into corrugated cardboard, which can then be folded easily along these crease lines. In the following, the term "cardboard" will designate corrugated cardboard.

The blank 100 comprises two longitudinal edges 104, 106 and two transversal edges 102, 108, two longitudinal crease lines 110, 112 and four transversal crease lines 114, 116, 118, 120 represented as dotted lines. The crease lines delimitate, following the direction of transport, two bottom corners 122, 124 and an internal rear panel 126, two internal side panels 128, 130 and a bottom panel 132, two middle corners 134, 136 and a front panel 138, two external side panels 140, 142 and a top panel 144, and finally two top corners 146, 148 and an external rear panel 150 of the blank 100. The distance between the two longitudinal crease lines 110, 112 determines the width of the box. The distance between the transversal crease lines delimitating the bottom panel 114, 116 and the top panel 118, 120 determines the length of the box. The distance between a longitudinal crease line 110, 112 and the closest edge of the blank 104, 106 together with the distance between the transversal crease lines 116, 118 delimitating the front panel determine the height of the box.

The distance between the crease lines 110, 112, 114, 116, 118, 120 and from the crease lines 110, 112, 114, 116, 118, 120 to the edges of the blank 102, 104, 106, 108 are adjusted to the dimensions of the articles to be packaged.

In the simplest embodiment, all crease lines are straight. However the two longitudinal crease lines 110, 112 may be offset in their upper section, above the middle section of the blank, to form a slightly wider top panel. This will compensate the additional thickness of the folded corners and result in an even more regular box. This operation can be achieved with a pair of crease rollers like in the patent EP3254840 of the applicant and will not be described further.

Figure 2A:
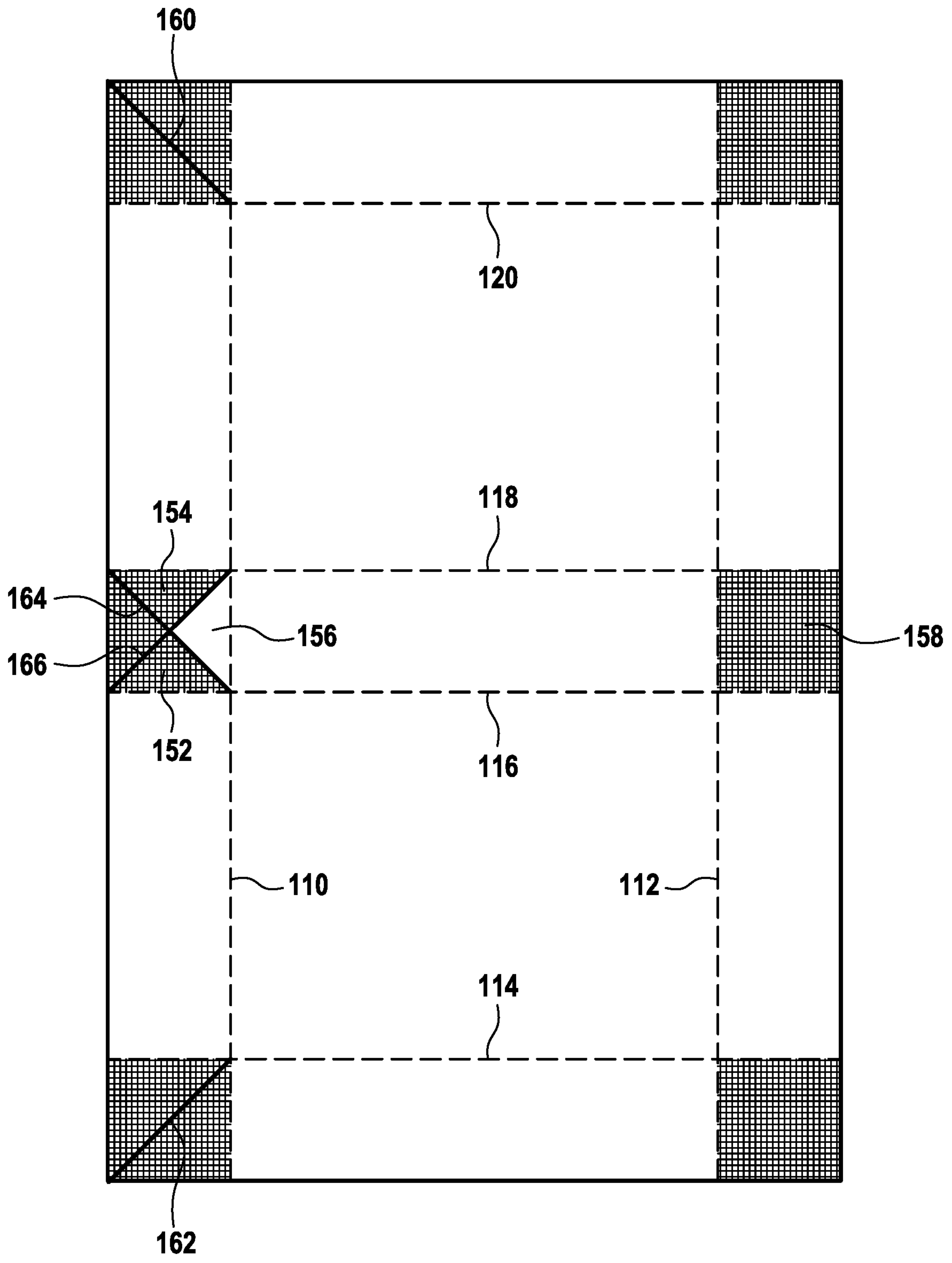
FIGS. 2A to 2C show where and how the cardboard is crushed to make it more flexible.
Figure 2B:
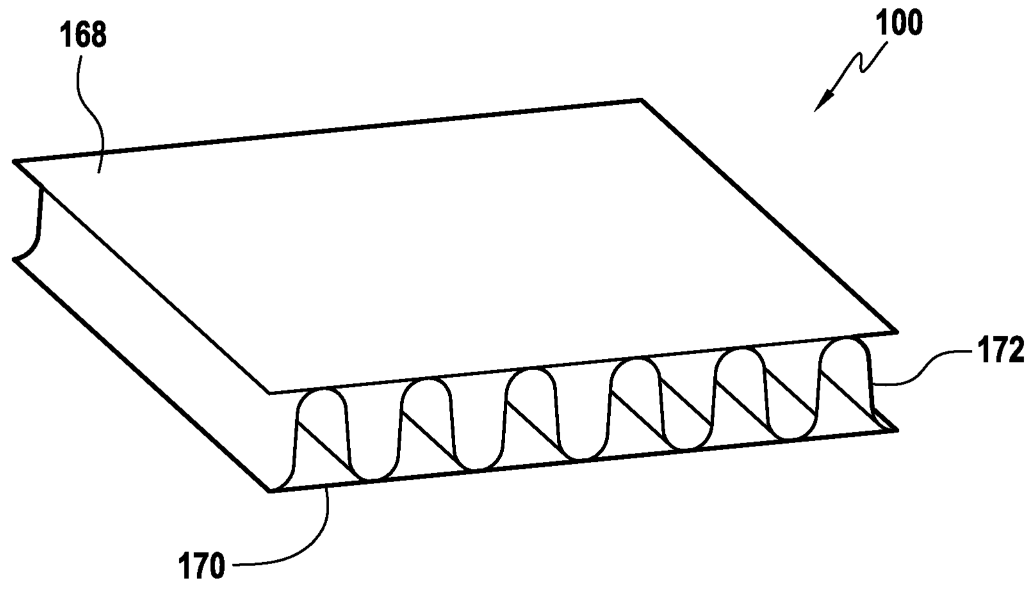
Figure 2C:
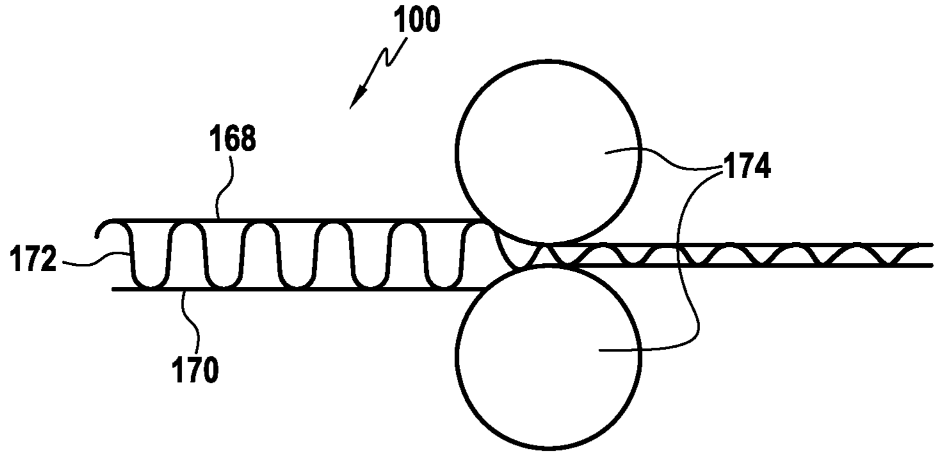

FIGS. 2A to 2C show where and how the cardboard is crushed to make it more flexible.

On FIG. 2A, the crushed areas correspond to the bottom 122, 124, middle 134, 136 and top 146, 148 corners, as delimited by the crease lines. Preferably, the entire surface of the bottom corners 122, 124 and top corners 146, 148 is crushed, and the crushed portion of the middle corners 134, 136 has the shape of two symmetrical, partly superimposed (more precisely on half), triangles (152, 154 as represented on the left middle corner) so as to keep another triangle 156 uncrushed. Other shapes are possible, for instance a square delimited by the crease lines (158 as represented on the right middle corner). This may be required to avoid excessive thickness near the middle corners of the box, but then it may be less easy to fold. The crushed area may also extend slightly beyond the crease lines, inside and/or outside the two middle corners 134, 136.

The crushed areas can be created by specific tools, for instance jaws of a press and/or pressing rollers, which are positioned symmetrically for their ends or tips to match the crease lines, and activated in a timely manner as the blank is transported into the device by a conveyor, for instance a suction belt. In this case, the width of the belt determines the smallest width of a box that can be created by the device, whereas the greatest width is determined by the width of the original blank supply.

The jaws may have a perfectly flat surface, so that the crushed areas are smooth, or a textured surface with small irregularities disposed in regular or random patterns. Similarly, the rollers may have a perfectly cylindrical surface or a textured surface. The advantage of a textured surface is that it creates multiple virtual crease lines, along which the corners are likely to fold during subsequent manufacturing operations of the box.

Additionally, the bottom, middle and top corners of the blank may be crushed by jaws having slightly protruding sharp edges to achieve both a reduced thickness in the corners and a predictable folding along diagonal crease lines (160, 162, 164, 166).

As illustrated on FIG. 2B, the blank 100 is typically made of corrugated cardboard, having two external flat layers 168,

170 enclosing one corrugated layer 172. Flute sizes A or C (according to standard US corrugated flutes) are usually stiff enough for products or parcels packaging but thicker cardboard having more than one corrugated layer may be used because it becomes flexible after being crushed as its thickness is reduced significantly. Thinner cardboard (e.g. flute sizes B and E) may also be used for product packaging.

FIG. 2C shows a side view of a blank of corrugated cardboard before and after is has been crushed by a pair 174 of opposite pressing rollers. When deactivated, no pressure is applied, or sufficient distance is left between the rollers for the cardboard freely pass through. Crushing the blank is achieved by applying pressure on the two opposite rollers or by imposing a given distance between the two opposite rollers while the blank is transported into the device. The distance between the two external flat layers is reduced significantly. The pressing rollers extend transversally so that the cardboard can be crushed on the entire surface of a corner, and not only along a crease line. The thickness of a cardboard blank having one corrugated layer can be reduced from around 2.6 mm to around 0.6 mm. Similarly, the thickness of a cardboard blank having two corrugated layers can be reduced from around 5.4 mm to around 1.4 mm. Consequently, as cardboard stiffness is primarily due to thickness, the cardboard becomes flexible and the blank much easier to fold in the crushed area.

Figure 3:
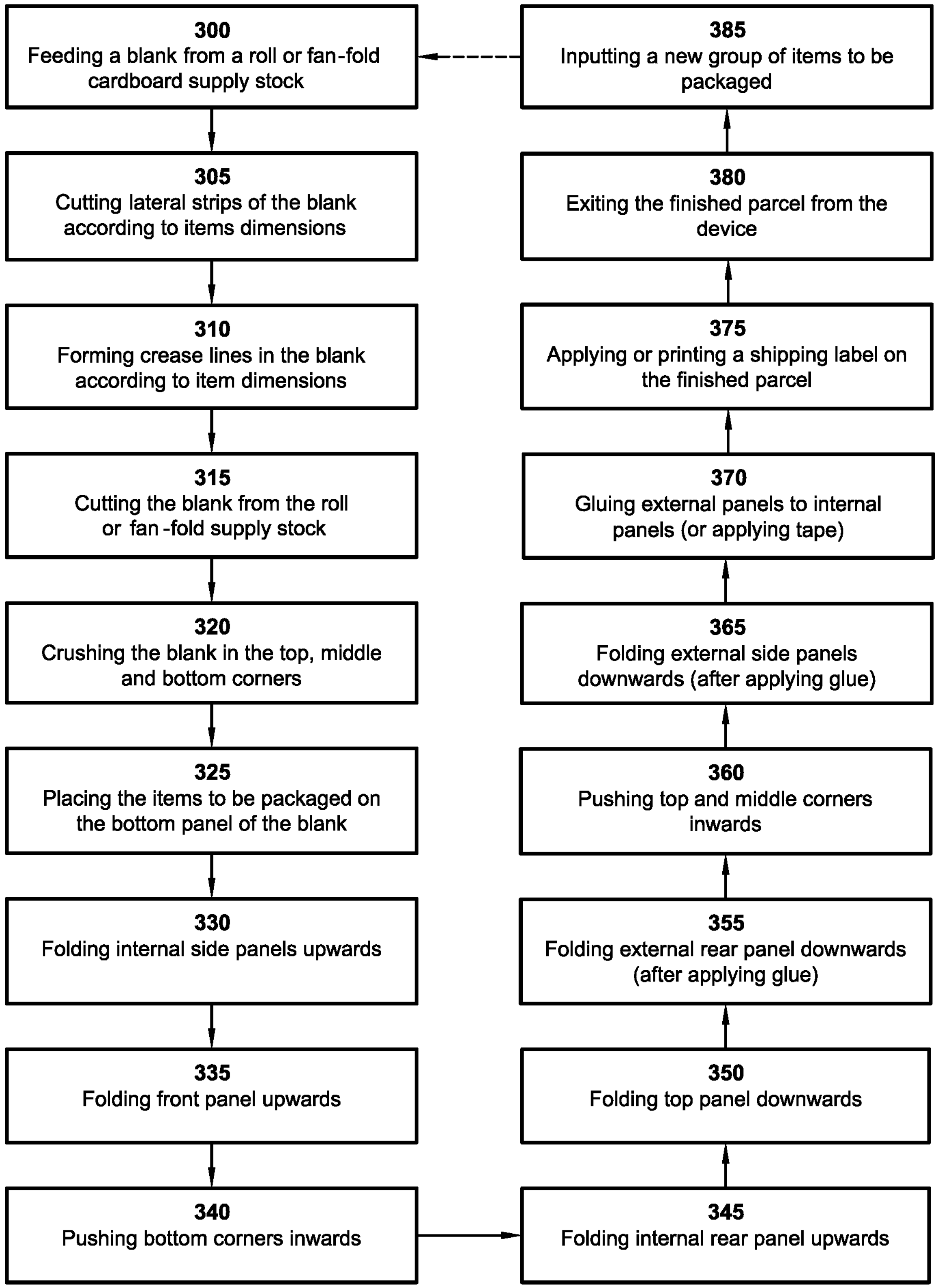
FIG. 3 is a flowchart showing the main acts of the manufacturing and packaging method according to one or more embodiments of the invention.

FIG. 3 is a flowchart showing the main acts of the manufacturing and packaging method according to at least one illustrated embodiment of the invention.

Although the flowchart is derived from the manufacturing operations of an automated packaging device, similar to the one of EP2951098, it shall be understood that some or all of those operations or acts, and notably the filling and folding operations or acts may be performed manually by an operator. Some operations or acts may also be performed in a different order. The flowchart merely represents a preferred embodiment of the invention.

At a first operation or act 300, a blank of corrugated cardboard is fed into the device from a roll or fan-fold supply stock. Alternatively, the blank may have been pre-cut to standard dimensions corresponding to the articles that are shipped the most often.

At operation or act 305, two lateral strips of the blank are cut away according to the dimensions of the articles to be packaged. This operation can be performed by two adjustable cutting wheels as the blank is transported into the device. This is the case if it has been determined that the original blank supply is too wide compared to the dimensions of the articles. These dimensions can be determined on-the-fly by a measuring device like in EP2951098, and a desired size of the blank is computed by the device. The cutting wheels are then adjusted symmetrically with respect to the centre line of the device, in order to cut lateral strips of the appropriate width on each side of the blank.

At operation or act 310, the crease lines are created in the blank according to the article dimensions. The two longitudinal crease lines are created by two adjustable crease wheels disposed symmetrically with respect to the centre line as the blank is moving into the device. The four transversal crease lines are successively created by a blade which is activated in a timely manner as the blank is transported into the device.

At operation or act 315, the blank is cut from the roll or fan-fold supply stock at the desired length. This operation can be performed by another or the same blade forming the four transversal crease lines. It is of course not necessary to cut the blank if it has been pre-cut to standard dimensions.

At operation or act 320, the blank is crushed in the top, middle and bottom corners successively by appropriate tools. The tools can be for instance jaws of a press and/or pressing rollers which are positioned symmetrically with respect to the centre line of the device for their ends or tips to match the crease lines, and activated in a timely manner as the blank is transported into the device. The same tools can be used to crush the top and bottom corners of the blank. The middle corners are preferably crushed by four pairs of opposite triangular jaws activated sequentially in a timely manner as the blank is transported into the device.

At operation or act 325, the articles to be packaged are placed on the bottom panel of the blank. This is achieved by means similar to the belt conveyor of EP2951098. The articles are transferred from the conveyor to the bottom panel as the blank is transported into the device.

At operation or act 330, the internal side panels are folded upwards. Again, this is achieved by means similar to the folding units of EP2951098. As no cut-outs have been made in the blank, this operation will cause the front, top and external rear panels to raise at an angle of approximately 60°, and the middle corners to fold along their diagonals. This is greatly facilitated if the middle corners have been crushed with triangular jaws as explained above. The front, top and external rear panels, which are further away in the device, may also be raised by a raising member prior to the folding of the internal side panels. Preferably, the internal side panels are folded upwards at an angle slightly greater than 90°, in order for other panels to abut against them when folded. The top panel may also be created slightly wider than the bottom panel as explained above.

At operation or act 335, the front panel is folded upwards and abuts against the internal side panels. This operation causes the front, top and external rear panel to be raised at a right angle.

At operation or act 340, the bottom corners are gently pushed inwards by soft fingers, in order for them to fold inside the box when the internal rear panel will be folded upwards. Alternatively, the bottom corners may be left outside, but this can complicate subsequent operations or acts.

At operation or act 345, the internal rear panel is folded upwards and abuts against the internal side panels. This operation cause the bottom rear corners to fold inside the box. As the blank has been crushed in this area, it is quite flexible and there is little or no risk that it will damage the articles to be packaged. If the bottom corners have been left outside, then they may be folded and maintained along the internal side panels at this stage.

At operation or act 350, the top panel is folded downwards and abuts against the internal panels.

At operation or act 355, the external rear panel is folded downwards and abuts against the internal rear panel. If the box is sealed by hot melt glue, then the glue may be deposited on the internal rear panel just before completing this operation or act.

At operation or act 360, the middle and top corners are gently pushed inwards by soft fingers, in order for the middle and top corners to fold between the internal and external side panels when the latter's will be folded.

At operation or act 365, the external side panels are folded downwards. This operation will cause the middle and top corners to fold between the internal and external side panels. If the box is sealed by hot melt glue, then the glue may be deposited on the internal side panels just before completing this operation or act.

At operation or act 370, the box is maintained closed until complete sealing by the glue. Alternatively, the box can be sealed by applying an adhesive tape to the bottom and external panels.

At operation or act 375, a shipping label is applied or printed on the box which is now a finished parcel.

At operation or act 380, the finished parcel exits from the automated packaging device.

At operation or act 385, new articles to be packaged enter the device.

It shall be understood that the method of the invention can be performed at high speed, so it is not necessary to wait until a finished parcel exits from the device before inputting new articles. Like in EP2951098, new articles can be introduced on-the-fly while articles introduced previously are being packaged. A device to practice the method of the invention is indeed very close to the system of EP2951098 and a similar throughput of around 500 parcels per hour can be expected.

FIGS. 4A to 4I show various views of the box according to at least one embodiment of the invention at various stages of folding.

The views will be described in accordance with the method operations or acts mentioned above. The articles to be packages have not been represented on these views for convenience.

Figure 4A:
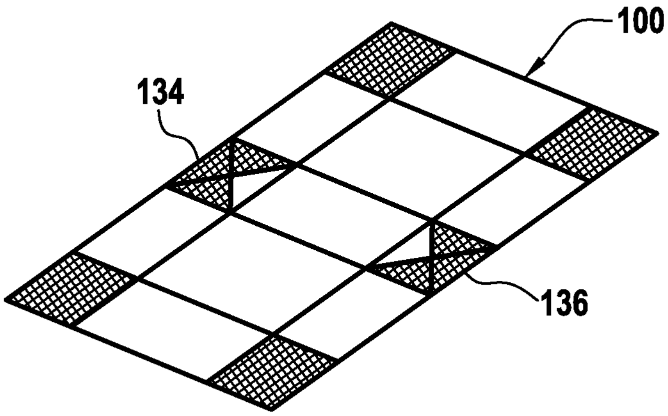
FIGS. 4A to 4I shows various views of the box according to one or more embodiments of the invention at various stages of folding.

FIG. 4A shows the blank 100 as it has been prepared at operation or act 320. The crushed portion in the middle corners 134, 136 has the shape of two symmetrical, partly superimposed, triangles (as represented on the left of FIG. 2A).

Figure 4B:
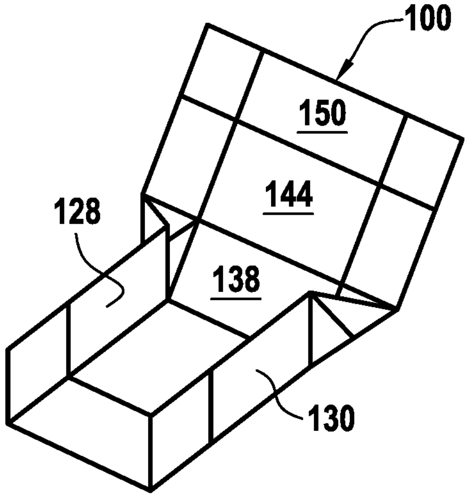

FIG. 4B shows the blank 100 with the internal side panels 128, 130 folded upwards, and the front panel 138, top panel 144 and external rear panel 150 partially raised at operation or act 330.

Figure 4C:
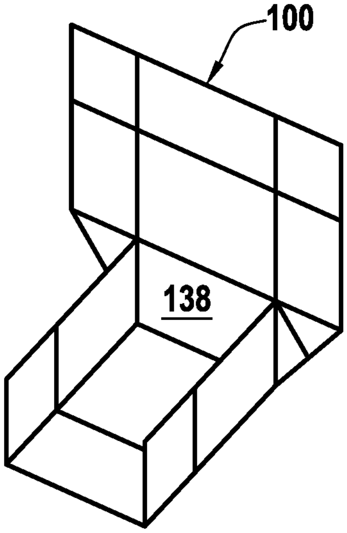

FIG. 4C shows the blank 100 with the front panel 138 folded upwards at operation or act 335.

Figure 4D:
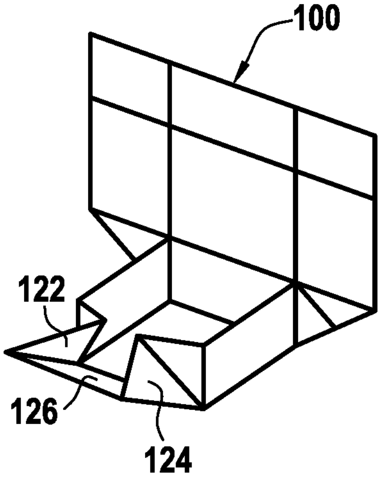

FIG. 4D shows the bottom corners 122, 124 pushed inwards and the internal rear panel 126 partially raised at operation or act 340.

Figure 4E:
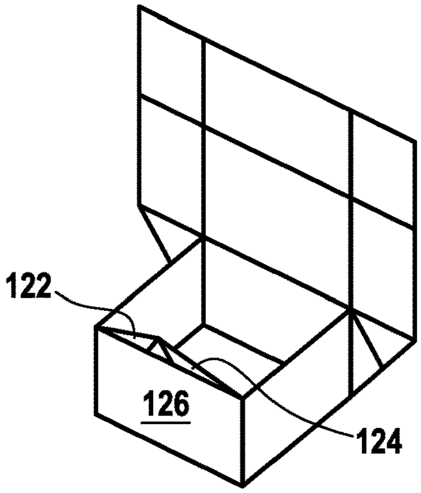

FIG. 4E shows the internal rear panel 126 folded upwards and the bottom corners 122, 124 folded inside the box at operation or act 345.

Figure 4F:
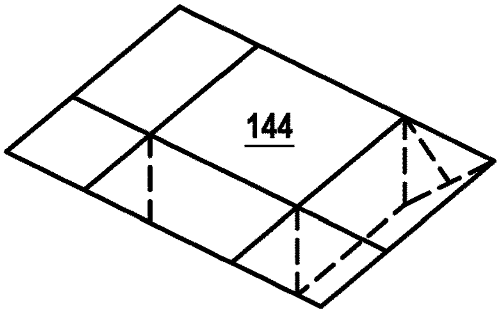

FIG. 4F shows the top panel 144 folded downwards at operation or act 350.

Figure 4G:
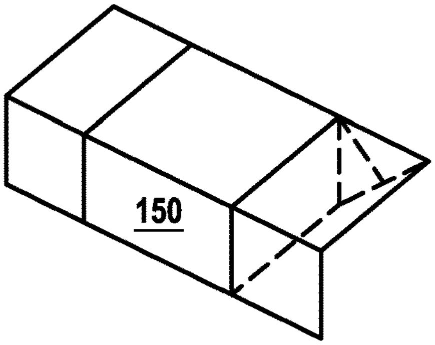

FIG. 4G shows the external rear panel 150 folded downwards at operation or act 355. If the box is sealed by hot melt glue, then the glue may be deposited on the internal rear panel 126 just before this operation or act.

Figure 4H:
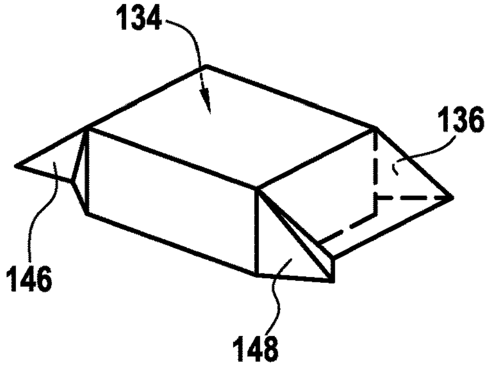

FIG. 4H shows the middle corners 134, 136 and the top corners 146, 148 pushed inwards and folding between the internal side panels 128, 130 and the external side panels 140, 142 during operation or act 360. If the box is sealed by hot melt glue, then the glue may be deposited on the internal side panels 128, 130 at this stage.

Figure 4I:
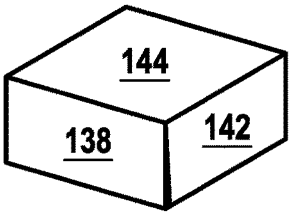

FIG. 4I shows the external side panels 140, 142 folded downwards with the middle corners 134, 136 and top corners 146, 148 folded between the internal side panels 128, 130 and the external side panels 140, 142 at operation or act 365. The box is completely folded with the articles packaged therein, and is maintained closed until complete sealing.

Figure 5:
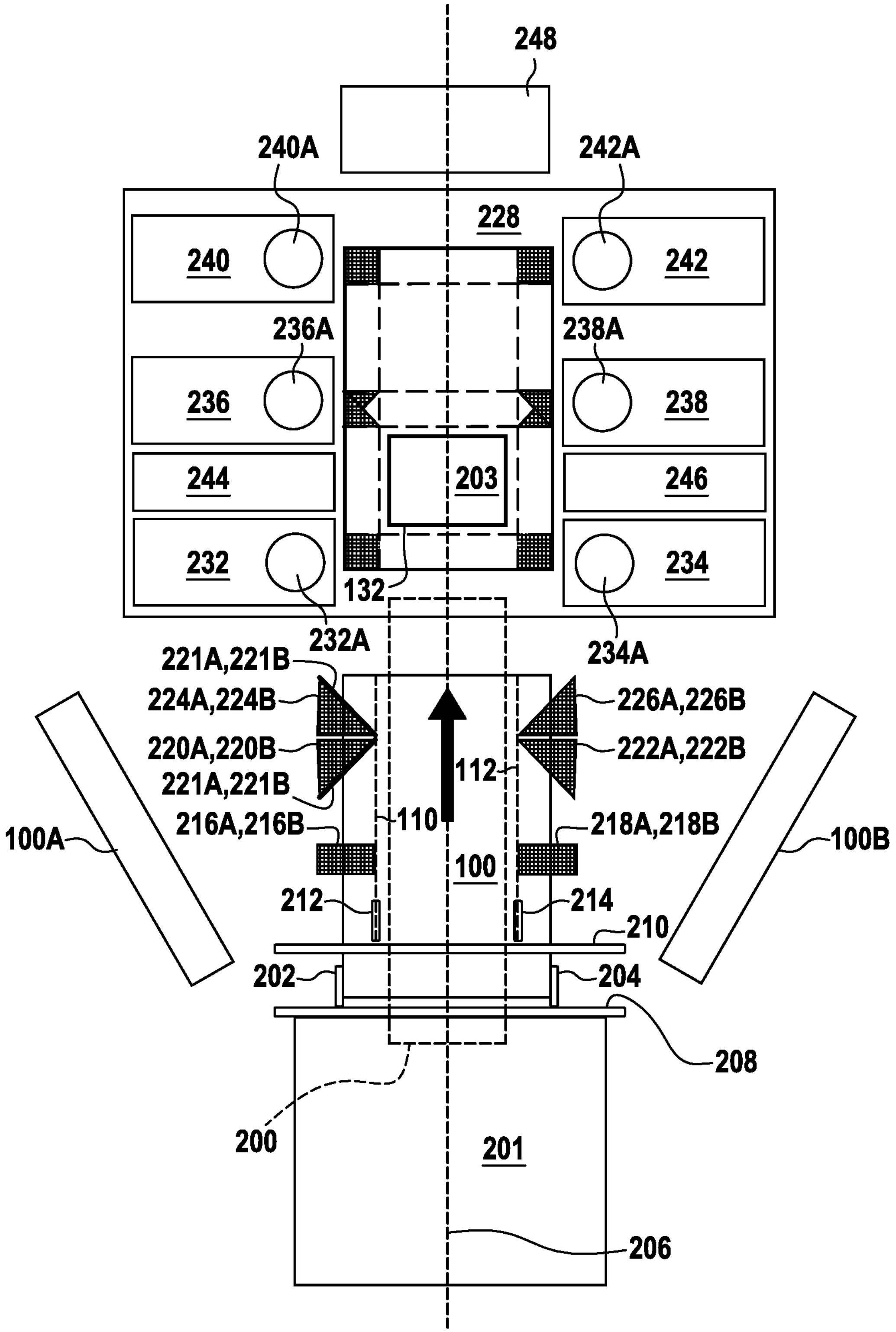
FIG. 5 shows the main elements of a device to practice the packaging method according to one or more embodiments of the invention.

FIG. 5 shows the main elements of an automated packaging device to practice a method according to a at least one embodiment of the invention.

As mentioned above, the device to practice the described method is in some respects similar to the system of EP2951098, and only some of the novel elements and/or operations or acts will be described in detail.

In a preliminary operation or act, cardboard is fed by a conveyor 200 from a roll or fan-fold supply stock 201 into the device. The desired width of a blank 100 is determined according to the dimensions of the articles to be packaged 203. Two adjustable cutting wheels 202, 204 are positioned symmetrically with respect to a centre line 206 of the device, in order to cut away lateral strips 100A, 100B of the appropriate width on each side of the blank, as it is transported in the direction of the arrow by the conveyor 200, while a transversal cutting blade 208 cuts the blank from the roll or fan-fold supply stock 201 at the desired length. This last operation may also be performed by a transverse cutter like in EP2951098.

A transversal crease blade 210 creates the transversal crease lines as the blank is transported into the device. This operation may also be performed by a single transverse score applicator like in EP2951098. In a specific embodiment, the transversal crease lines may also be created by the transversal cutting blade operated at lower pressure.

A pair of crease wheels 212, 214 are arranged symmetrically with respect to the centre line 206 and their lateral position is adjusted according to the desired with of the box. These two crease wheels create the two longitudinal crease lines 110, 112 as the blank is transported into the device.

Two pairs of opposite pressing rollers 216A, 216B; 218A, 218B (corresponding to pressing rollers 174 of FIG. 2C) are arranged symmetrically with respect to the centre line 206 of the device. Their lateral position is adjusted fort their ends to match the two longitudinal crease lines 110, 112. The pressing rollers are then activated in a timely manner to crush the top and bottom corners of the blank. When a blank is completed, it is only required to release the pressing rollers, displace them laterally and activate them again to crush the top corners of the following blank.

The same pairs of pressing rollers may be used for the middle corners if the corresponding crushed area is square. The pair of pressing rollers may also be displaced laterally back and forth while the blank is transported into the device, in order to create a triangular shape 152, 154. In a preferred embodiment, this operation is performed by four pairs of opposite triangular jaws 220A, 220B; 222A, 222B; 224A, 224B; 226A, 226B arranged symmetrically with respect to the centre line 206 of the device, which are displaced laterally for their tips to match the two longitudinal crease lines 110, 112, and activated in a timely manner as the blank is transported into the device. The jaws may also have slightly protruding sharp edges (for example 221A, 221B, 225A, 225B) to produce the diagonal crease lines 160, 162, 164 and 166. Crease lines 160, 162 are created after the top and bottom corners have been crushed by pressing rollers 216, 218.

The device further comprises an inserting and folding station 228, through which the blank 100 is transported and where the articles to be packaged 203 are deposited on the bottom panel 132. The folding operations are in some respects similar to the ones made by the system of EP2951098, and may be performed with the same or similar elements. The biggest differences are that the folding units 232, 234, 236, 238, 240, 242 comprise additional soft fingers 232A, 234A, 236A, 238A, 240A, 242A to push the corners inwards, and that additional glue applicators 244, 246 are provided on each side of the inserting and folding station 228 if hot melt glue is used to seal the box instead of adhesive tape. The soft fingers may be mechanical elements such as rubber blades or air jet blowers oriented in the appropriate direction. The device also comprises an additional labelling station 248 to apply shipping labels on the finished parcels.

The device has been described in accordance with the method of FIG. 3, but its elements may be disposed in a different manner. For instance, the transversal crease lines may be created after the corners of the blank has been crushed. No transversal cutting blade may be required if the blanks are pre-cut to standard dimensions, as the blanks are neither fed nor cut from a roll or fan-fold supply stock, but rather taken from a stack automatically or introduced manually. Of course, the blank may also be cut to size and creased according to the dimensions of small items to be packaged even if the blank is pre-cut to standard dimensions.

Alternatively, feeding, transporting, cutting and creasing operations may be performed with the same structures as employed in EP2951098, and only crushing, folding and sealing operation be performed with additional means. The device may include one or more processors and one or more storage media that stores processor-executable instructions for execution by the one or more processors to control one or more of the various described structures to complete the various described operations.

Although various embodiments the invention has been described in the context of automated parcel packaging, the box may be used as primary packaging for a variety of products, and its manufacturing method may be performed, partially or entirely, with simple hand tools.

Figure 6:
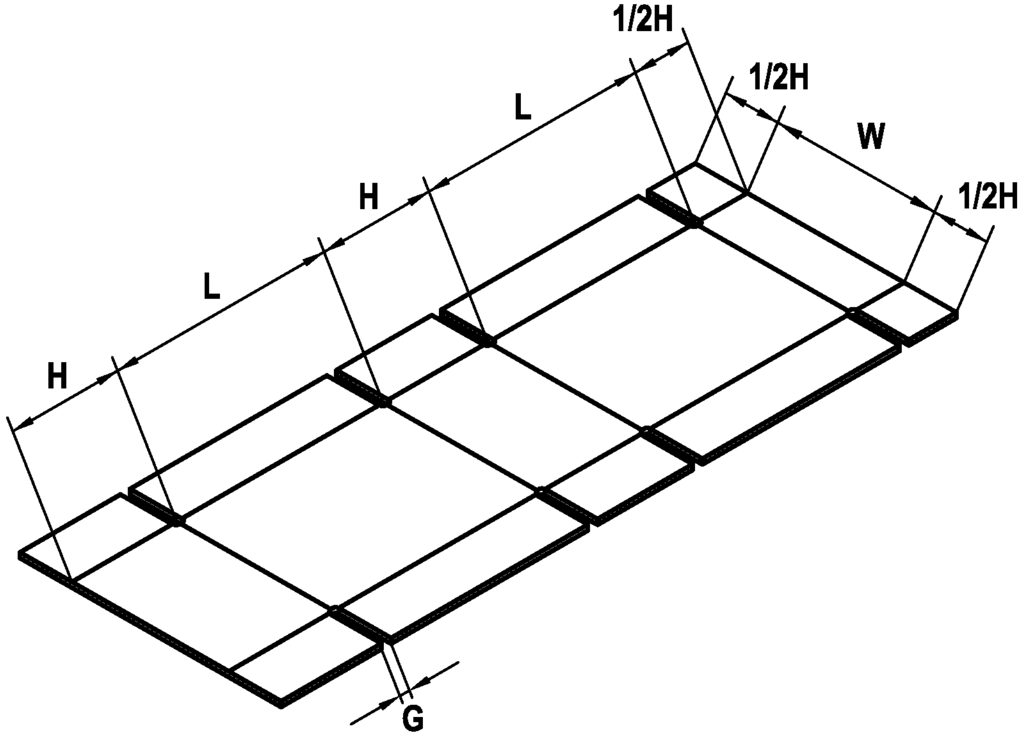
FIG. 6 is an example of a blank for automated packaging of the prior art.

FIG. 6 is an example of a blank of the prior art as represented in EP2951098, with lateral cut-offs resulting in the drawbacks mentioned above.

The invention claimed is:

1. A device for automated packaging of articles, comprising a conveyor for feeding and transporting into the device a blank of corrugated cardboard, a pair of crease wheels for creating two longitudinal crease lines in the blank, the pair of crease wheels arranged symmetrically with respect to a center line of the device and whose lateral positions are adjustable according to a desired width of a box to be formed from the blank of corrugated cardboard, a transversal blade or score applicator for successively creating four transversal crease lines in the blank as the blank is transported into the device, and opposite pressing members, arranged symmetrically with respect to one another laterally across the center line of the device, whose lateral positions are adjustable for their ends or tips to match the two longitudinal crease lines, and activated in a timely manner as the blank is transported into the device to crush the corrugated cardboard in a top, middle and bottom corners of the blank in order to make it easily foldable.

2. The device of claim 1, further comprising a pair of cutting wheels and either a transversal cutting blade or a transverse cutter to cut the blank according to a number of dimensions of the articles to be packaged.

3. The device of claim 1, further comprising a roll or cardboard fan-fold supply stock from which the blank is fed by the conveyor.

4. The device of claim 1, further comprising folding units to fold the blank along the crease lines to package articles deposited thereon.

5. The device of claim 4, further comprising soft fingers to fold the top, middle and bottom corners inside as the blank is folded along the crease lines.

6. The device of claim 1, further comprising an adhesive tape or hot melt glue applicator to seal the box formed from the blank once completely folded.

7. The device of claim 1, wherein the opposite pressing members comprise at least one of i) jaws of a press or ii) pressing rollers.

* * * * *